(12) United States Patent
Peng et al.

(10) Patent No.: US 11,662,914 B2
(45) Date of Patent: May 30, 2023

(54) REAL-TIME LIBRARY-BASED IN SITU DRIVE TEST, DRIVE HEAD STATUS DETECTION, CLEANING VERIFICATION AND TRACKING

(71) Applicant: QUANTUM CORPORATION, San Jose, CA (US)

(72) Inventors: James P. Peng, Santa Maria, CA (US); Turguy Goker, Vista, CA (US); Stephen C. Cooper, Costa Mesa, CA (US); William R. Weakley, Boulder, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/528,440

(22) Filed: Nov. 17, 2021

(65) Prior Publication Data

US 2022/0197515 A1  Jun. 23, 2022

Related U.S. Application Data

(60) Provisional application No. 63/129,781, filed on Dec. 23, 2020.

(51) Int. Cl.
| | |
|---|---|
| *G11B 5/02* | (2006.01) |
| *G06F 3/06* | (2006.01) |
| *G11B 5/008* | (2006.01) |
| *G11B 5/455* | (2006.01) |

(52) U.S. Cl.
CPC .......... *G06F 3/0616* (2013.01); *G06F 3/0653* (2013.01); *G06F 3/0686* (2013.01); *G11B 5/00813* (2013.01); *G11B 5/455* (2013.01)

(58) Field of Classification Search
CPC ......... G11B 5/00; G11B 33/142; G11B 33/08; G11B 25/043; G11B 5/59694; G11B 15/6835; G11B 5/5582; G11B 27/36; G11B 5/00813; G11B 5/455; G11B 5/02
USPC ..................... 360/69, 75, 92.1, 60
See application file for complete search history.

(56) References Cited

U.S. PATENT DOCUMENTS

| | | | |
|---|---|---|---|
| 8,824,088 B2* | 9/2014 | Kwon | G11B 5/5582 360/75 |
| 10,437,270 B2* | 10/2019 | Kwon | G11B 33/142 |
| 2012/0039002 A1* | 2/2012 | Saliba | G11B 23/049 |
| 2015/0092298 A1* | 4/2015 | Kim | G06F 3/0644 360/92.1 |

* cited by examiner

*Primary Examiner* — Nabil Z Hindi
(74) *Attorney, Agent, or Firm* — Roeder & Broder LLP; James P. Broder

(57) ABSTRACT

A media library (10) for evaluating a health of a head (256) of a media drive (26) includes a library control system (30) that is configured to control oversight functionality of the media library (10). The library control system (30) receives media drive information generated during at least one of a read procedure and a write procedure being performed by the media drive (26) and analyzes the media drive information to determine the health of the head (256) of the media drive (26). The media drive information includes drive performance metrics generated by the media drive (26) during a read verify procedure performed by the media drive (26) upon request of the library control system (30) of the media library (10).

20 Claims, 11 Drawing Sheets

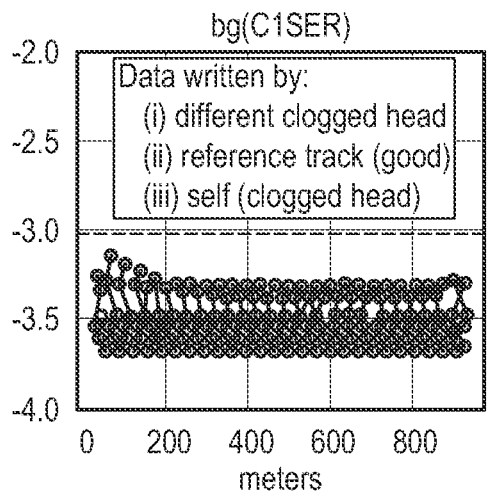
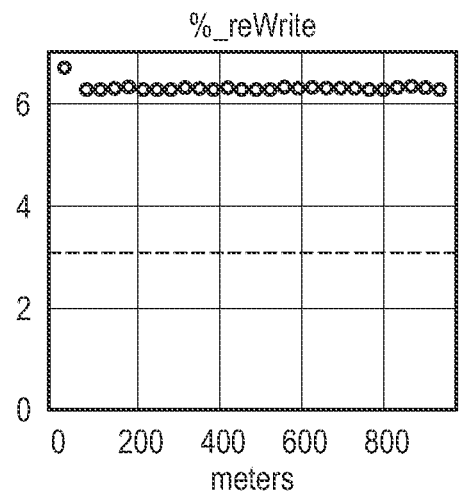
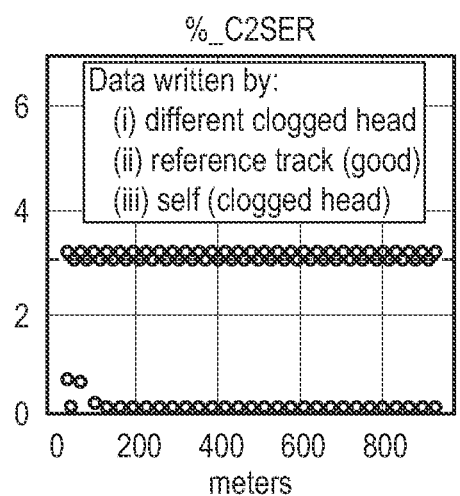
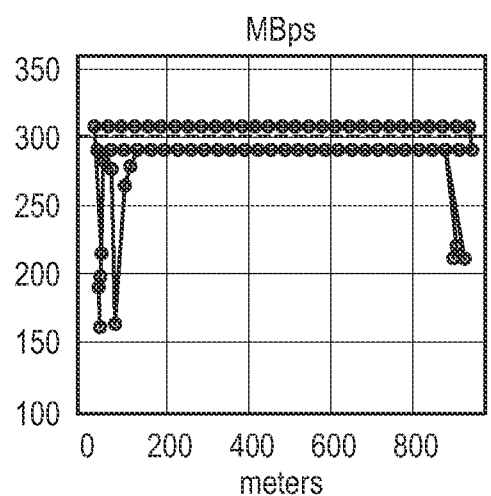
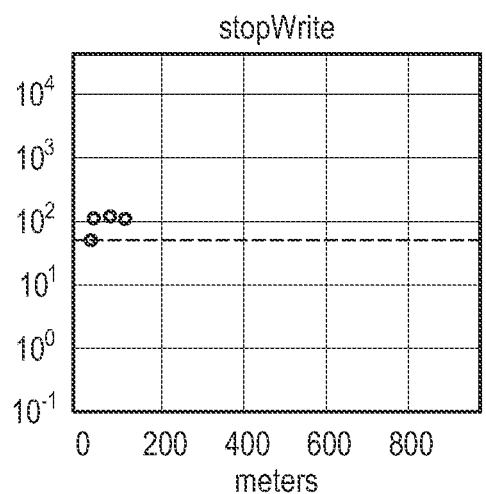
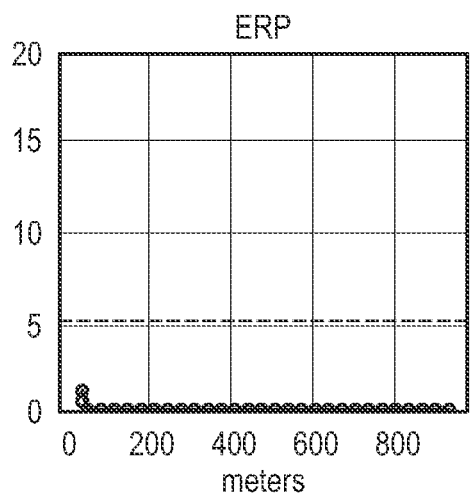
FIG. 5

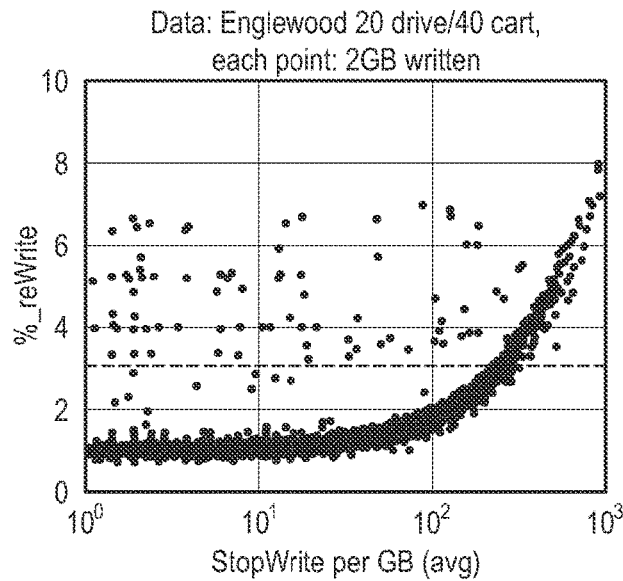

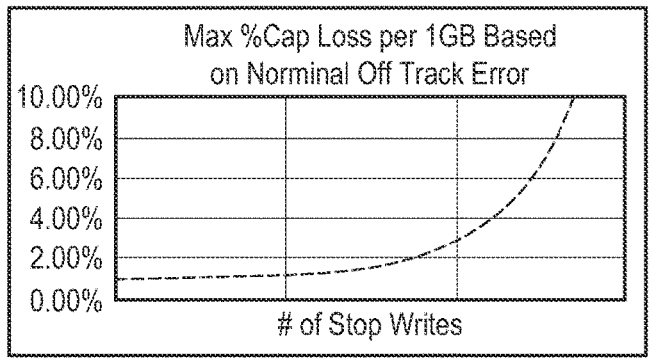

Stop Write capacity loss model vs Test Data

- Assumption is 1% rewrite nominal plus Stop writes where off track time causes total 3 SCO's to be rewritten
- Stop Writes will use Option #3 as specified by the format
- Experimental data is based on 20 LTO8 HH drives and 40 LTO8 cartridges used in a full round mode mode each write being 2 wraps for 4 partitions
- This data is not based on the new improved tracking FW.
- Actual loss of capacity due to Stop Writes can be more than the curve itself

FIG. 8

REAL-TIME LIBRARY-BASED IN SITU DRIVE TEST, DRIVE HEAD STATUS DETECTION, CLEANING VERIFICATION AND TRACKING

RELATED APPLICATION

This application claims priority on U.S. Provisional Application Ser. No. 63/129,781 filed on Dec. 23, 2020 and entitled "REAL-TIME LIBRARY-BASED IN SITU DRIVE TEST, DRIVE HEAD STATUS DETECTION, CLEANING VERIFICATION AND TRACKING". As far as permitted, the contents of U.S. Provisional Application Ser. No. 63/129,781 are incorporated in their entirety herein by reference.

BACKGROUND

Automated media library systems, such as automated tape library systems, are commonly utilized for purposes of writing data to and reading data from media cartridges, such as magnetic tape cartridges. Magnetic tape cartridges are configured to retain and/or store magnetic tape that can be used in a magnetic tape drive for purposes of reading data from and writing data to the magnetic tape. Magnetic tape cartridges have been used extensively because they provide a convenient way to house and support a length of magnetic tape for engagement by a transducer (or tape head, sometimes simply referred to as a "head") in the tape drive while protecting the tape upon removal of the cartridge. Moreover, magnetic tape cartridges facilitate economic and compact storage of data, especially when such data is being stored over long periods of time such as for archival storage purposes. During use of the magnetic tape drive, a tape head of the magnetic tape drive is configured to be in direct contact with the magnetic tape from the magnetic tape cartridge so that data can be written to and read from the magnetic tape in a series of data tracks and/or data bands as the magnetic tape moves across the tape head at varying speed from low speed to high speed. Such tape heads can include dedicated write heads, dedicated read heads, or combination read/write heads.

Current tape applications experience capacity and/or performance loss when the media library system encounters errors (random or correlated) due to tracking, head issues such as read sensor (tunneling magnetoresistive (TMR) sensor) failures, write head problems or an unverified head debris cleaning process. This can be a problem for all applications, but especially for large scale systems. When constant capacity is used where the application tries to fit large sizes of data chunks to single or multi-partition formats, capacity loss can result in unexpected End of Partition (EOP) errors which can happen after many hours of operation.

In tape applications, the most critical technology is the interface between the head and the tape, which is affected by write and read magnetics, tracking, tribology, and environmental conditions. Issues related to the head/tape interface can result in capacity loss, degradation of performance, and other errors including hard errors. Magnetic tape heads, especially TMR sensors used in new high areal density, high-capacity tape drives such as LTO-8 or LTO-9, have a tendency to get clogged with debris, stain, or develop shorts that can be partial, full, or open due to corrosion. If these issues go undetected early in the write operation by the tape drive, it can result in permanent and systematic capacity loss, and can also result in lower read reliability if these heads are used to read other recordings. For example, a loss of a single TMR sensor in a typical 32 head construction can be enough to cause a severe capacity loss for the application unless it is detected early in the usage. For instance, with LTO-8 format, a loss of a single TMR sensor will result in 5.2% minimum capacity loss such that an advertised 12 TB capacity cannot be maintained and the application will encounter EOP errors with high certainty.

In addition to the read sensors, write heads, which do the actual magnetization of the magnetic particles, may have problems such as spacing loss due to debris and tracking problems, especially correlated ones that may result in loss of capacity and performance degradation.

Drive manufacturers typically develop formats that provide a range of capacities where they advertise the nominal values as the target capacity. For example, with LTO-8, the 12 TB advertised capacity is the nominal capacity, where 11.6 TB capacity is the minimum capacity. Typically, the format has excess capacity (around 3% based on format) such that in most cases the tape library system will achieve the nominal advertised capacity. However, in certain conditions, the tape library system may not be able to reach the nominal value. In these cases, the format allows a minimum capacity to be maintained, otherwise it results in a hard error in either the tape drive or the storage media.

With 3.45% excess capacity in LTO-8 systems, the tape drive can typically write at least 11.67 TB, which meets the format's 11.6 TB minimum capacity. Therefore, in such situations, the tape drive may still allow read and write operations without claiming hardware problems per format.

However, the application that writes fixed capacity even slightly less than 12 TB will experience EOP errors. This is mostly a problem for very large scale, data center type applications, where the tape library system cannot afford the loss of capacity and must benefit from nominal capacity. In such applications, often greater than 90% of the drives and media are able to meet the 12 TB capacity, but in certain conditions where a drive sensor or head is bad, degraded or has persistent debris then it will fail to write 12 TB, thus resulting in EOP errors. In certain applications, a single suspect TMR head can result in minimum 5.2% direct capacity hit per LTO-8 format, plus typical media defects that require rewrites and stop-write tracking errors which also require rewrites. This can be typically 6.2% for a single head sensor failure.

Tape drives typically possess proprietary data relating to a condition of the tape heads included within the tape drive that the host and media library cannot access. This can cause a problem for the host where unless it uses minimum capacity, there will be a probability of EOP errors due to media debris, head sensor failure or even writer issues. Unfortunately, with the limited information that is specifically available to the host, the host is not able to detect and identify the root cause of such errors. The media library has the ability to collect more detailed data in comparison to the host, however it does not work on the data path incorporated within the tape drives themselves, so it cannot write read data directly to determine the health of the tape drive and the storage media. Due to proprietary or confidentiality issues, typically libraries sold with drives installed cannot share this level of data with host applications or host vendors. This, in turn, creates an issue of how best to manage the tape drives such that the application can benefit from nominal capacity, but also be able to predict and determine the health of the tape drive with what information is available, which, as noted, is less than the drive's internal proprietary database.

SUMMARY

The present invention is directed toward a media library for evaluating a health of at least one head of a media drive. In various embodiments, the media library includes a library control system that is configured to control oversight functionality of the media library. The library control system can receive media drive information generated during at least one of a read procedure and a write procedure being performed by the media drive. The library control system analyzes the media drive information to determine the health of the at least one head of the media drive.

In certain embodiments, the media drive information can include one or more drive performance metrics generated by the media drive during a read verify procedure performed by the media drive upon request of the library control system of the media library.

In various embodiments, the drive performance metrics include at least one of log (C1SER) data, % Rewrite data, % C2SER data, and Stop-write data. Alternatively, the drive performance metrics can include at least two, at least three or each of log (C1SER) data, % Rewrite data, % C2SER data, and Stop-write data.

In some embodiments, the library control system of the media library can request the media drive to perform the read verify procedure using a pre-written test cartridge.

In certain embodiments, the pre-written test cartridge can include pre-written data within a first partition and a second partition that is usable to test one or more read heads of the media drive.

In various embodiments, the library control system can utilize a read head sensor algorithm to analyze at least one of the drive performance metrics generated by the media drive as the media drive reads from the first partition and the second partition to determine the health of the one or more read heads of the media drive.

In certain embodiments, the library control system can utilize the read head sensor algorithm to analyze the at least one of the drive performance metrics generated by the media drive as the media drive reads from the first partition and the second partition to determine whether the one or more read heads of the media drive need to be cleaned.

In various embodiments, the library control system can generate a read head report regarding the health of the one or more read heads of the media drive, and send the read head report to a host regarding the health of the one or more read heads of the media drive.

In some embodiments, the test cartridge can include a third partition; and the media library can request that a host write random data into the third partition to be read by the media drive during an evaluation of at least one write head of the media drive.

In various embodiments, the library control system can utilize a write head tracking algorithm to analyze at least one of the drive performance metrics generated by the media drive as the media drive reads from the third partition to determine the health of the at least one write head of the media drive.

In certain embodiments, the library control system can generate a write head report regarding the health of the write head of the media drive, and send the write head report to the host regarding the health of the at least one write head of the media drive.

In some embodiments, the host can write a drive dump to a fourth partition of the pre-written test cartridge including information from the read head report and the write head report, and the library control system utilizes one of an Artificial Intelligence and a Machine Learning-type predictive algorithm for evaluating media drive maintenance requirements based on the information included within the drive dump.

The present invention is further directed toward a method for evaluating a health of at least one head of a media drive, the method including the steps of controlling oversight functionality of a media library with a library control system of the media library; receiving media drive information with the library control system, the media drive information being generated during at least one of a read procedure and a write procedure being performed by the media drive; and analyzing the media drive information with the library control system to determine the health of the at least one head of the media drive.

The present invention is also directed toward a media library for evaluating a health of a head of a media drive, the media library including a library control system that is configured to control oversight functionality of the media library, the library control system receiving media drive information including drive performance metrics generated by the media drive during a read verify procedure performed by the media drive upon request of the library control system to the media library, the drive performance metrics include at least two of log (C1SER) data, % Rewrite data, % C2SER data, and Stop-write data; wherein the library control system of the media library requests the media drive to perform the read verify procedure using a pre-written test cartridge that includes pre-written data within a first partition and a second partition, the pre-written data being usable to test a read head of the media drive; wherein the library control system utilizes a read head sensor algorithm to analyze the drive performance metrics generated by the media drive as the media drive reads from the first partition and the second partition to determine the health of the read head of the media drive; wherein the library control system generates a read head report regarding the health of the read head of the media drive; wherein the media library requests that a host write random data into a third partition of the test cartridge to be read by the media drive during an evaluation of a write head of the media drive; wherein the library control system utilizes a write head tracking algorithm to analyze the drive performance metrics generated by the media drive as the media drive reads from the third partition to determine the health of the write head of the media drive; and wherein the library control system generates a write head report regarding the health of the write head of the media drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5 is a graphical illustration of library accessible drive performance metrics for a typical performance of a tape drive with a suspect channel that has been identified as an EOP error candidate, such drive performance metrics being obtained during testing of the read heads;

FIG. 8 is a graphical illustration of a stop write capacity loss write mode tracking model versus test data;

DESCRIPTION

Figure 1:
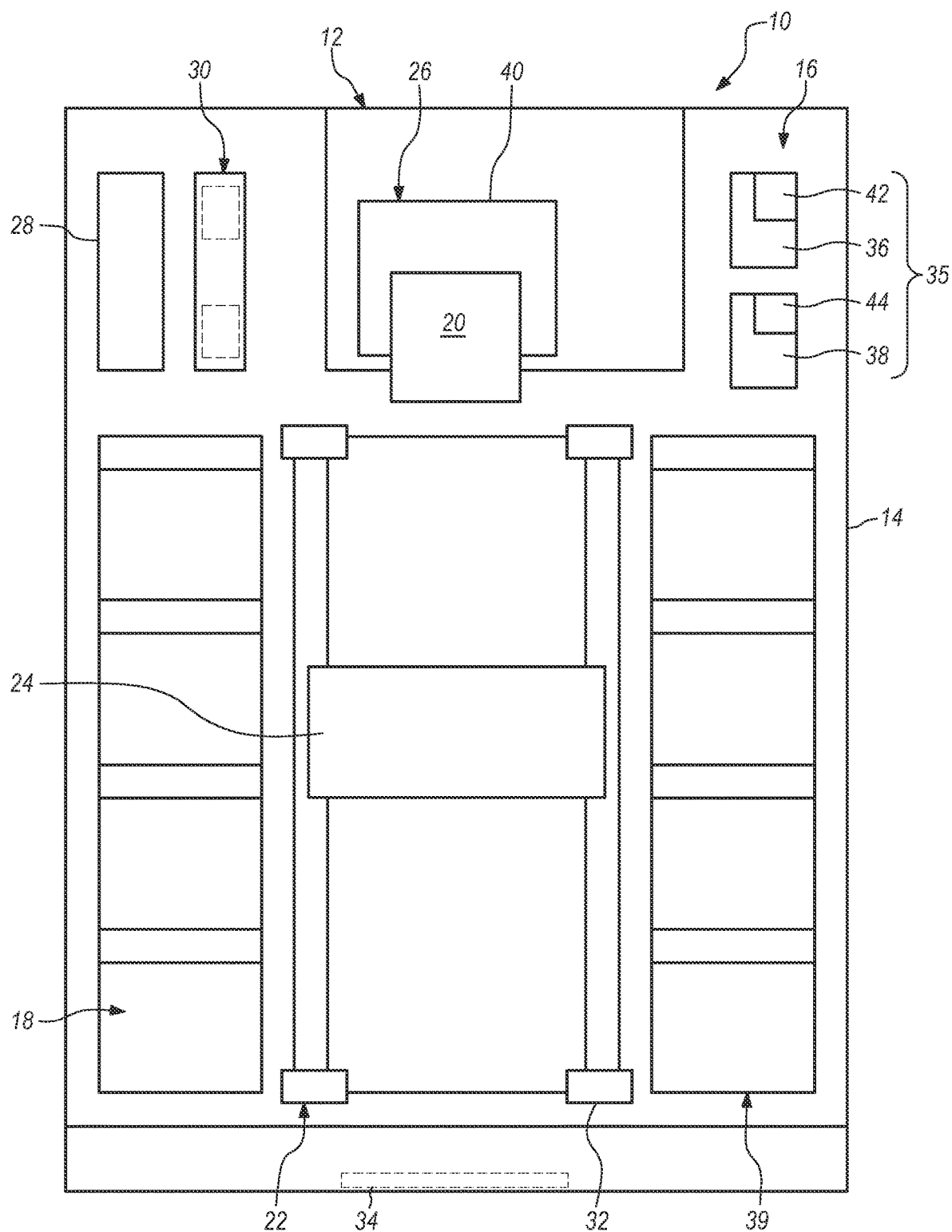
FIG. 1 is a simplified schematic top view illustration of an embodiment of an automated media library system having features of the present invention.

The challenge with testing a tape drive within a tape library system is how to best ensure that issues with the tape drive can be most effectively isolated from issues within the storage media. Embodiments of the present invention are described herein in the context of a specially-designed algorithm or methodology that incorporates a process that utilizes information that can be made specifically available to the tape library system (and is not proprietary within the tape drive itself), and is able to detect and determine head performance (TMR read heads, write heads) and tracking performance of a tape drive even though the tape library does not have direct access to the proprietary data path within the tape drive itself. In particular, library-based firmware and hardware can use this methodology to test tape drives and verify cleaning processes based on current cleaning media and be able to respond back to a host with drive performance status. By utilizing such algorithm or methodology, isolation of problem tape drives having head issues or systematic tracking problems can enable applications to use nominal tape capacity without experiencing excessive EOP and other tape drive problems. This algorithm and methodology uses one or more special test media with pre-established zones to determine if the results are correlated with the tape drives, not the storage media.

More specifically, as described in detail herein, tape head (read heads and write heads) status detection can be done either by the tape drive itself using internal information, or by the host and/or the tape library, individually or in combination, pursuant to the present invention by using drive performance data to predict capacity loss and determine the state of the tape head. For example, the algorithm and/or methodology of the present invention can determine tape head state, such as TMR read heads being full short or open, partial short, suffering from excess debris, or any combination thereof, and/or write heads having too much spacing loss. In addition to the noted tape head issues, other dominant errors that affect capacity and performance include the tracking which results in Stop Writes (tape tracking disturbance events where writing must be paused and restated later on). In various embodiments, the tape library system with tape drives and host interface can identify the tape head conditions and tracking problems to prevent capacity loss that can result in EOP errors. Also, the described process can be used in conjunction with current cleaning cartridge usage to provide a true closed-loop cleaning verification where tape drives can be put back into action knowing that cleaning is successful, and tape heads are functional. It is appreciated that the proposed in situ test algorithm and/or methodology can also enable host, cloud or libraries to implement Artificial Intelligence/Machine Learning-based predictive tape drive maintenance. This concept is done by the library using pre-established test cartridges and algorithms based on its available drive performance metrics without requiring extensive host or tape drive involvement.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic top view illustration of an automated media library system 10 (also referred to herein simply as a "media library"), such as a tape library system in certain embodiments, including a media drive system 12, such as a tape drive system in certain embodiments, having features of the present invention. In FIG. 1, a top cover (not shown) has been omitted for clarity so that the interior of the media library 10 is visible. The design of the media library 10 can be varied as desired. In particular, the media library 10 can have any suitable design that is capable of storing a plurality of media cartridges. More specifically, it is noted that the media library 10 illustrated in FIG. 1 is just one non-exclusive example of a media library 10 usable with the present invention, and no limitations are intended based on the specific type and/or size of the media library 10 shown in FIG. 1. Although the media library 10 shown and described relative to FIG. 1 is specifically shown and/or described at times as a tape cartridge library or tape library, it is understood that the present invention is equally applicable for use with any other suitable types of libraries using other types of media cartridges, such as optical disks, magnetic disk drives, emulated or virtual media drives, etc., as non-exclusive examples. However, for ease of discussion, FIG. 1 and certain other Figures herein are sometimes described using tape cartridges as the applicable media cartridge, although this is not intended to restrict or limit the present invention in this manner.

In various embodiments, as illustrated in FIG. 1, the media library 10 can include one or more of: (i) a library housing 14 that defines an library interior 16, (ii) a plurality of storage slots 18 that are each configured to receive and selectively retain (and store) a storage media cartridge 20, such as a tape cartridge in certain embodiments (also sometimes referred to herein simply as a "media cartridge", "storage media", or simply "media"), (iii) a rack assembly 22, (iv) a media cartridge retrieval assembly 24 (also sometimes referred to herein as a "retrieval assembly"), (v) the media drive system 12 including one or more media drives 26, such as tape drives in certain embodiments, (vi) a power supply 28, (vii) a library control system 30, (viii) one or more racks 32, (ix) a graphical user interface 34 (illustrated in phantom, and also sometimes referred to herein as a "GUI"), and (x) a climate controller 35. In some embodiments, the climate controller 35 can include one or more temperature controllers 36 (only one temperature controller 36 is illustrated in FIG. 1), and/or one or more humidity controllers 38 (only one humidity controller 38 is illustrated in FIG. 1).

As an overview, the media library 10 is uniquely configured to implement an algorithm or methodology that utilizes library hardware and firmware, and the specific information that is available thereto, to test the status of tape drives and verify cleaning processes for the tape drives based on current cleaning media and be able to respond back to the host with drive performance status of the tape heads; and to provide tracking performance evaluation of the write heads. It is appreciated that the algorithm is implemented in a manner so as to effectively provide the performance metrics and tracking data of the tape heads of the tape drive without having access to the full proprietary data path for the tape drive which is only available within the tape drive itself.

The library housing 14 is configured to retain various components of the media library 10. For example, in the embodiment illustrated in FIG. 1, the plurality of storage slots 18, the rack assembly 22, the retrieval assembly 24, the one or more media drives 26 of the media drive system 12, the power supply 28, the library control system 30, the rack(s) 32, and the climate controller 35 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped or any other suitable shaped cross-section. Further, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the media cartridge(s) 20. More particularly, in various embodiments, each of the storage slots 18 is configured to receive and retain a single media cartridge 20. It is noted that no media cartridges 20 are shown as being retained within the storage slots 18 in FIG. 1 for clarity.

The media library 10 can include any suitable number of storage slots 18, and/or the media library 10 can be designed to retain any suitable number of media cartridges 20. Moreover, the storage slots 18 can be arranged within the media library 10 in any suitable manner. For example, in certain embodiments, the media library 10 can include forty storage slots 18 arranged in two four-by-five storage areas. More particularly, in this embodiment, the media library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the media library 10 can include greater than forty or fewer than forty storage slots 18 and/or the storage slots 18 can be arranged in a different manner than is illustrated and described in relation to FIG. 1. For example, in certain non-exclusive alternative embodiments, the media library 10 can be configured to include hundreds or even thousands of storage slots 18, each being configured to receive and retain a separate media cartridge 20.

The media cartridges 20 can include a plurality of tape cartridges, or the media cartridges 20 can alternatively include a plurality of optical disks usable within an optical disk drive, magnetic disks usable within a magnetic disk drive, emulated tapes usable within an emulated tape drive, etc., as non-exclusive examples.

The design and configuration of the rack assembly 22 can be varied to suit the specific requirements of the media library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a media cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The media storage retrieval assembly 24 selectively, e.g., upon request of a user or host application, retrieves and moves the media cartridge 20 as desired between the storage slots 18 and the media drives 26. In particular, during use, upon receiving a signal from the library control system 30 to access a certain media cartridge 20, the retrieval assembly 24 can be manipulated to physically retrieve the requested media cartridge 20 from its associated storage slot 18 in the media library 10. Subsequently, the retrieval assembly 24 moves the media cartridge 20 to an appropriate media drive 26, and inserts the media cartridge 20 into a drive housing 40 of the media drive 26 so that requested read/write operations can be performed. Upon completion of the requested read/write operations, the retrieval assembly 24 can then return the media cartridge 20 to an appropriate storage slot 18.

It is appreciated that although a single retrieval assembly 24 is illustrated in FIG. 1, the media library 10 can be designed to include more than one retrieval assembly 24. For example, in one non-exclusive alternative embodiment, the media library 10 can include two retrieval assemblies 24 that function in different portions of the media library 10 and/or that provide redundancy in the event that one of the retrieval assemblies 24 fails.

The one or more media drives 26 are configured for reading and/or writing data with respect to the media cartridge 20. The number of media drives 26 provided within the media library 10 can be varied to suit the specific requirements of the media library 10. For example, in certain embodiments, the media library 10 can include three media drives 26 that are stacked substantially one on top of another (with limited spacing therebetween). Alternatively, the media library 10 can include greater than three or fewer than three media drives 26 and/or the media drives 26 can be positioned in a different manner relative to one another. For example, in certain non-exclusive alternative embodiments, the media library 10 can be configured to include one hundred or more media drives 26. Depending on the specific design of the media library 10, the media drives 26 can be adapted for use with different types of media, such as tape cartridges, optical disks, hard disks, etc.

In certain embodiments, the media library 10 can include more than a single media drive system 12 for purposes of providing the one or more media drives 26. For example, in some embodiments, the media library 10 can include a plurality of media drive systems 12, with each media drive system 12 including one or more individual media drives 26. In one such embodiment, the media library 10 can include three individual media drive systems 12, with each media drive system 12 including a single media drive 26, to provide a total of three media drives 26 for the media library 10. Alternatively, the media library 10 can include any desired number of media drive systems 12 and/or media drives 26.

The power supply 28 provides electrical power in a well-known manner to the one or more media drives 26, the retrieval assembly 24, the library control system 30 and/or additional media libraries 10. The power supply 28 can be interfaced with these components as well as with an external power source in a well-known manner using industry standard cabling and connections. Alternatively, the power supply 28 can be interfaced with these components in another manner.

The library control system 30 provides the desired and necessary control for oversight functionality of the media library 10. For example, it is appreciated that the library control system 30 is configured to control the algorithm and/or methodology as set forth within the present invention for purposes of detecting and determining adverse or negative head performance and tracking performance of a media drive 26 without the proprietary data available only within the media drive 26 itself. As referred to herein, the library control system 30 is provided independently of any additional controllers that may be specifically included on a surface of or within individual media drives 26 which control reading and writing operations of the media drives 26, such as reading data from, and writing data to media cartridges 20.

The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors, and/or for controlling the climate controller 35. Further, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the media library 10 in a different position or manner than that illustrated in FIG. 1.

The media library 10 can use well-known industry standard cabling and communication protocols between the library control system 30 and other structures of the media library 10. Cabling and electrical characteristics including signaling protocols can be generally standardized, and the logical message protocols can be either proprietary or standardized as known to those skilled in the art.

As shown, the media library 10 can also include the GUI 34, such as an interactive touchscreen graphical user interface or another suitable graphical user interface, which allows the user or host to interact with and/or transmit requests or commands to and/or from the media library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on a climate outside of the library interior 16. As noted, in certain embodiments, the climate controller 35 includes the temperature controller 36 and the humidity controller 38.

The temperature controller 36 regulates and/or adjusts the temperature within the library interior 16 of the media library 10. The design and/or particular type of temperature controller 36 included in the media library 10 can vary. For example, the temperature controller 36 can include any suitable type of cooling unit that can selectively lower the temperature within the library interior 16; and/or the temperature controller 36 can include any suitable type of heating unit that can selectively increase the temperature within the library interior 16. In various embodiments, the temperature controller 36 can include one or more temperature sensors 42 (only one temperature sensor 42 is illustrated in FIG. 1) that can sense an ambient temperature within or outside of the library interior 16. The temperature sensor(s) 42 can have any suitable design and/or can be positioned in any suitable location(s), such as within and outside of the library interior 16 of the media library 10. In certain embodiments, the temperature controller 36 can receive data from the temperature sensor 42, and automatically adjust and/or control the temperature within the library interior 16 in accordance with predetermined temperature standards based on such data.

The humidity controller 38 regulates and/or adjusts the humidity within the library interior 16 of the media library 10. The design and/or particular type of humidity controller 38 included in the media library 10 can vary. For example, the humidity controller 38 can include any type of humidifier or dehumidifier, or any other suitable type of humidity controller 38 that can selectively change (raise or lower) and/or control the humidity within the library interior 16. In various embodiments, the humidity controller 38 can include one or more humidity sensors 44 (only one humidity sensor 44 is illustrated in FIG. 1) that can sense the humidity within or outside of the library interior 16. The humidity sensor(s) 44 can have any suitable design and/or can be positioned in any suitable location(s), such as within and outside of the library interior 16 of the media library 10. In certain embodiments, the humidity controller 38 can receive data from the humidity sensor 44, and automatically adjust and/or control the humidity within the library interior 16 in accordance with predetermined humidity standards based on such data.

Figure 2:
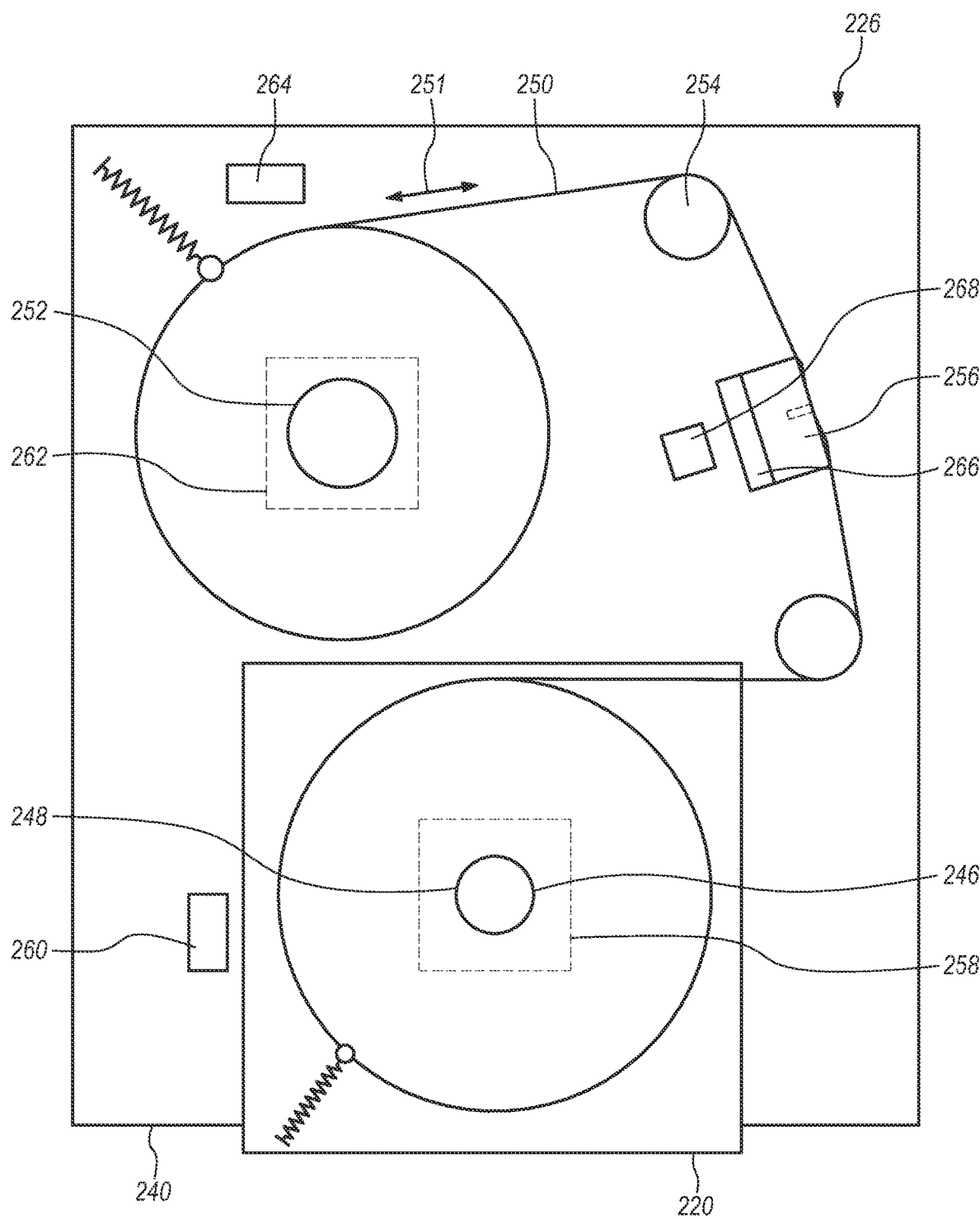
FIG. 2 is a simplified schematic top view illustration of a tape drive, and a tape cartridge that has been inserted into the tape drive, which can be included as part of the media library system illustrated in FIG. 1.

FIG. 2 is a simplified schematic top view illustration of a media drive 226, such as a magnetic tape drive, and a media cartridge 220, such as a magnetic tape cartridge, that has been inserted into the media drive 226, which can be included as part of the media library system 10 illustrated in FIG. 1. In FIG. 2, covers for the media drive 226 and the media cartridge 220 have been omitted for clarity so that the interior of such components is visible. As shown in this embodiment, the media cartridge 220 is configured to retain a magnetic tape 250. It is appreciated that the media drive 226 as shown in FIG. 2 represents a generic tape drive, and is shown by way of example and not by way of limitation. In some embodiments, the media drive 226 operates in compliance with an LTO specification, such as LTO-8 or LTO-9. Stated in another manner, in such embodiments, the media cartridge 220 is an LTO-compatible tape cartridge.

During use of the media drive 226, the media cartridge 220 is inserted into a drive housing 240 of the media drive 226 so that the media drive 226 can read data from and/or write data to the media cartridge 220. As shown, the media cartridge 220 includes a cartridge reel 246 that includes and/or defines a cartridge hub 248. The magnetic tape 250 is spooled about the cartridge hub 248 of the cartridge reel 246. In certain embodiments, the magnetic tape 250 can include at least one servo track (not shown) and a plurality of data tracks (not shown) that run along a longitudinal length of the magnetic tape 250. Each of these tracks can be positioned substantially parallel to each other.

The media cartridge 220 supplies the magnetic tape 250 to the media drive 226. More particularly, when the media cartridge 220 is inserted into the drive housing 240 of the media drive 226, one end of the magnetic tape 250 is taken up within the media drive 226 to be wrapped around a drive reel 252 included in the media drive 226. The magnetic tape 250 traverses a predefined path 251 (illustrated as a two-headed arrow) between the cartridge reel 246 and the drive reel 252, which is defined, a least in part, by one or more rollers 254 (two are shown in FIG. 2) positioned at strategic positions along the predefined path 251. The rollers 254 may also aid in limiting gross lateral movement (i.e. in and out of the page as shown in FIG. 2) of the magnetic tape 250, i.e. lateral tape motion or "LTM".

Along the predefined path, the drive reel 252 moves the magnetic tape 250 across a head assembly 256 (also sometimes referred to herein simply as a "head") that is configured to read data from and/or write data to the magnetic tape 250. In alternative embodiments, the head assembly 256 can include at least one read head, at least one write head, and/or at least one read/write head. In particular, the head assembly 256 is positioned in close proximity to the predefined path 251 of the magnetic tape 250 such that as the magnetic tape 250 travels in the longitudinal direction (by being wound from the cartridge reel 246 to the drive reel 252 or vice versa) the head assembly 256 can read/write data to particular tracks and longitudinal positions of the magnetic tape 250. Additionally, the head assembly 256 and/or a separate head assembly can include one or more servo elements configured to read the servo track(s) of the magnetic tape 250 in order to effectively maintain proper alignment between the head assembly 256 and the magnetic tape 250. It is appreciated that the media drive 226 can include any suitable number of heads within the head assembly 256 for purposes of reading data from and/or writing data to the magnetic tape 250. For example, in one non-exclusive embodiment, the head assembly 256 can include 32 heads for purposes of reading data from and/or writing data to 32 data tracks on the magnetic tape 250.

In some embodiments, as shown, the media drive 226 can also include a cartridge reel motor 258 (illustrated as a box in phantom) that generates the necessary force to rotate the cartridge reel 246 at will, and a cartridge reel encoder 260, e.g., a sensor or detector, that is configured to output signals representing the pulse rate (or rotation rate) of the cartridge reel motor 258. Additionally, the media drive 226 can further include a drive reel motor 262 (illustrated as a box in phantom) that generates the necessary force to rotate the drive reel 252 at will, and a drive reel encoder 264, e.g., a sensor or detector, that is configured to output signals representing the pulse rate (or rotation rate) of the drive reel motor 262.

As illustrated in this embodiment, the media drive 226 also includes an actuator 266 and a drive controller 268, including one or more processors and circuits, that can be communicatively coupled to the head assembly 256. The actuator 266 is configured to control the lateral position of the head assembly 256 and/or the individual heads of the head assembly 256 relative to the magnetic tape 250 based on a signal provided by the drive controller 268. As such, the actuator 266 comprises a mechanical positioner to move the head assembly 256 up or down laterally. By controlling the lateral position of the head assembly 256 relative to the magnetic tape 250, particular tracks of the magnetic tape 250 can be accessed as desired. Alternatively, the media drive 226 can include more than one actuator 266. For example, the media drive 226 can include a separate actuator 266 for each head.

The drive controller 268 is in communication with the actuator 266 and a number of other components within the media drive 226. For example, although not specifically shown in FIG. 2, each of the cartridge reel motor 258, the cartridge reel encoder 260, the drive reel motor 262, and the drive reel encoder 264 can be in communication with the drive controller 268. As such, the drive controller 268 can be configured to perform various specified operations, either individually, or in combination with other software, hardware and/or firmware elements.

Figure 3:
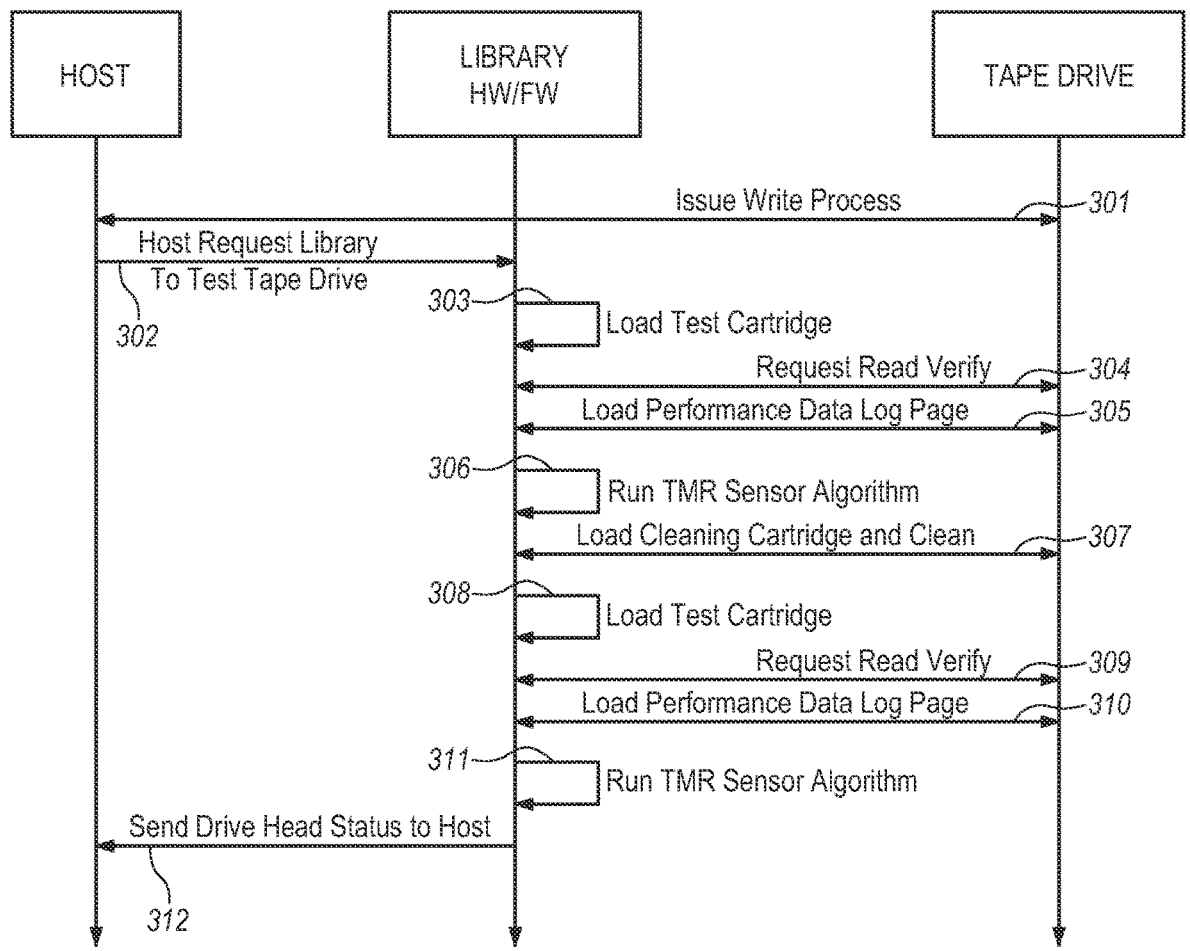
FIG. 3 is a simplified flow chart illustrating an order of tasks between a host, library hardware/firmware, and a tape drive in one implementation of the present invention that tests read heads.

FIG. 3 is a simplified flow chart illustrating a methodology detailing an order of tasks between a host, a media library (including a library control system, or hardware/firmware), and a tape drive in one implementation of the present invention that is configured to test read heads within the tape drive. More particularly, this methodology is configured to focus on how the media library can effectively test and evaluate the health of the TMR read sensors within the tape drive for shorts, opens, and/or persistent debris, without requiring proprietary information directly from the tape drive. It is appreciated that different implementations of this methodology can include additional steps other than those specifically delineated, can omit certain of the steps that are specifically delineated, and/or the order of the steps can be modified without deviating from the spirit of the present invention.

Initially, at step 301, the host can issue a write process request to be performed by the tape drive. It is appreciated that while the host is using the tape drive for a writing procedure, the host still has the ability to estimate the quality of the tape drive regarding if the probability of an EOP problem is high by capturing tape media linear position ("LPOS", which is LTO format nomenclature referring to the Linear Tape Position counter) and the amount of data written to the tape. In particular, using both variables, the host can estimate if EOP problems are highly likely or not. In essence, the host estimates the probability of EOP problems within the tape drive based on how the tape drive has performed during one or more write process requests.

At step 302, the host sends a request to the media library to test the tape drive. In particular, when the host determines that an EOP problem may occur, the host can stop the write procedure and move the media cartridge to another tape drive so the write process can continue using another tape drive. The host can then send a message to the media library to test the tape drive to determine if the condition of the tape heads is such that a cleaning process should be pursued and/or if one or more of the tape heads are bad and need to be repaired or replaced within the tape drive.

At step 303, the media library loads a test cartridge into the tape drive to be tested. In particular, the media library loads the special test cartridge into the tape drive, where controlled configured data has originally been written to various locations onto the tape within the test cartridge. The test cartridge is then usable by the media library to test the TMR read heads to verify if cleaning is necessary.

In certain embodiments, the media library will have one or more pre-written test cartridges that are usable within the present invention. It is appreciated that the pre-written cartridges will be a worn media that needs to be replaced after a number of usages. The design of the pre-written cartridges can be varied. In one non-exclusive embodiment, the pre-written cartridge will have at least four partitions, with each partition having a data band of an equal size. The top and bottom partitions, which will include edge tracks, will have prerecorded tracks that are both trimmed and untrimmed. The media library will use such tracks in the top and bottom partitions to test the TMR read sensors. A third partition will be used by each tape drive to write random test data for writer and tracking evaluation, such as described in greater detail herein below. A fourth partition can be used by the host to keep the test data with its own metadata so that the system can have access to the historical data to implement Artificial Intelligence or Machine Learning-type predictive algorithms for drive maintenance. Such data can include, but is not limited to: (i) read log page data and analysis results; (ii) write mode logs and analysis results; (iii) tape drive serial number; (iv) drive dumps (i.e. detailed information about the heads that is generated during testing) when there is an error; (v) environmental conditions; (vi) cleaning data; and (vii) date and time. In certain alternative embodiments, the historical test data can initially be stored in a buffer, and the library control system can schedule a time for such historical test data to be dumped to the fourth partition of the pre-written cartridge during a low duty time.

Subsequently, at step 304, the media library requests that the tape drive perform read verify operations using the specially configured test cartridge. More specifically, with the test cartridge having been loaded into the tape drive, the media library can instruct controlled multiple read verify commands such that after each verify the tape drive can download library accessible tape drive performance metrics.

At step 305, information from the tape drive in the form of a performance data log page is provided from the tape drive to the media library based on the read verify operations that have been performed by the tape drive.

At step 306, the media library is configured to run a TMR sensor algorithm, in which the library control system (hardware and firmware) analyzes the performance data that has been collected and determines the condition of the TMR read heads.

Figure 4:
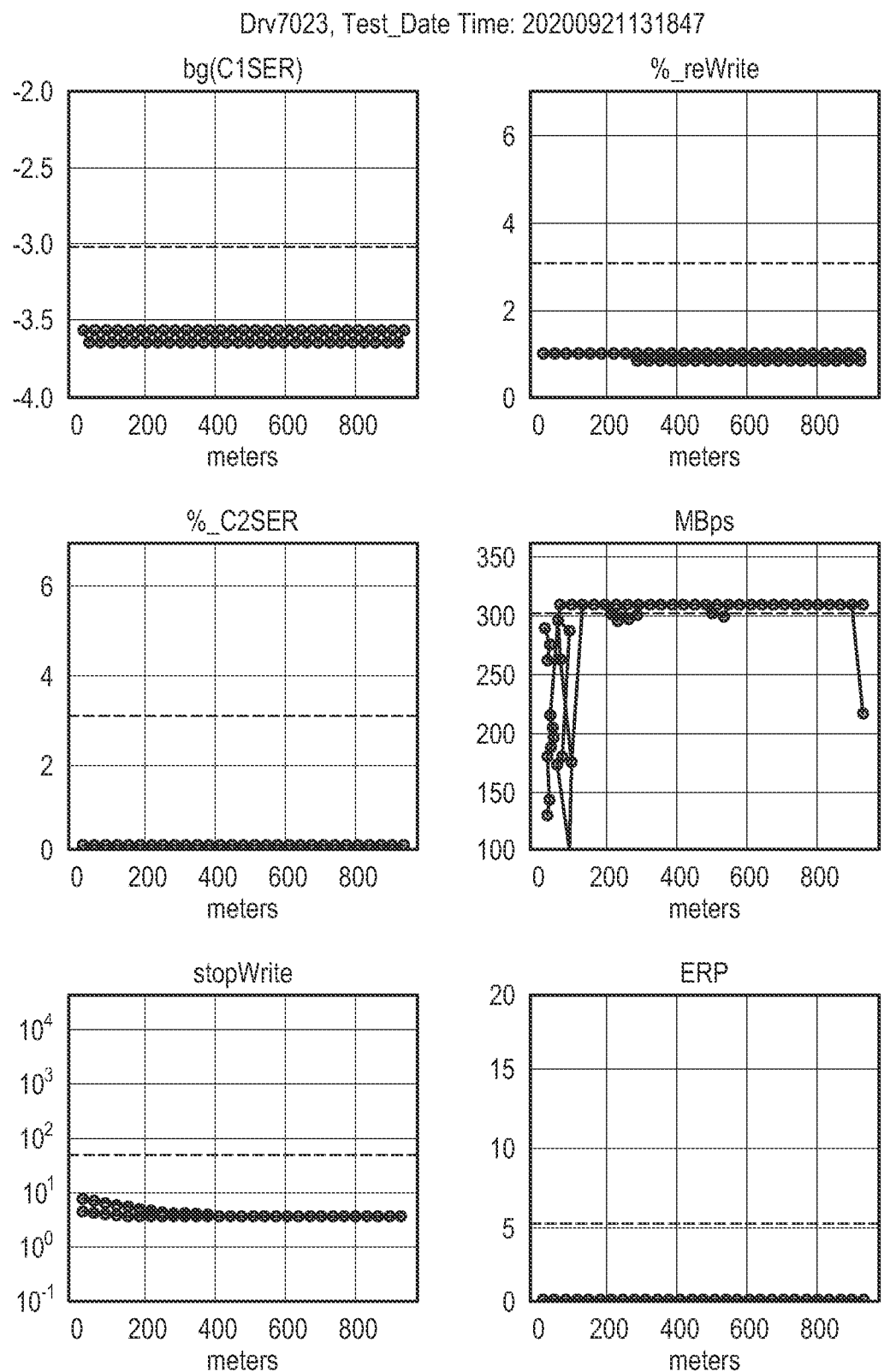
FIG. 4 is a graphical illustration of library accessible drive performance metrics for a typical performance of a good tape drive during testing of the read heads.
Figure 6:
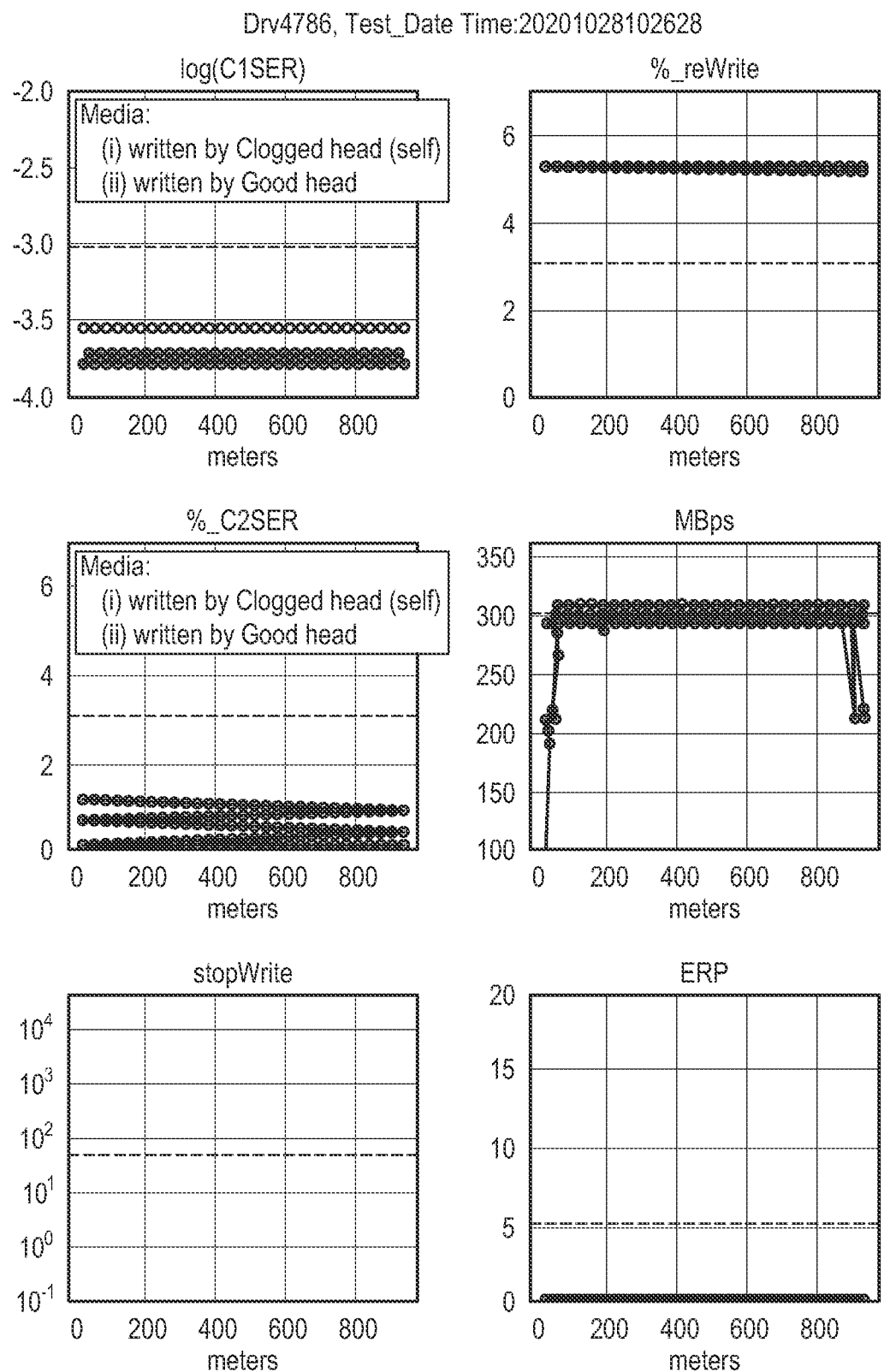
FIG. 6 is a graphical illustration of library accessible drive performance metrics for a typical performance of a tape drive with a partial bad channel that will generate an EOP problem, such drive performance metrics being obtained during testing of the read heads.

Referring now by way of example to FIG. 4, FIG. 5 and FIG. 6, the library control system analyzes various performance metrics from the performance data log page to determine if a cleaning process of the tape drive (and the tape heads) is warranted. For example, as illustrated, the performance metrics that are evaluated in this step can include, but are not limited to, (1) log (C1SER) data; (2) % Rewrite data; (3) % C2SER data; (4) MBps data; (5) Stop-write data; and (6) ERP data.

FIG. 4 is a graphical illustration of library accessible drive performance metrics for a typical performance of a good tape drive during testing of the read heads. More particularly, FIG. 4 shows the typical performance of a good tape drive, with all functional TMR sensors, using library-accessible tape drive performance metrics. While all six of the performance metrics are included in individual graphs in FIG. 4, and other performance metrics can also be used, the primary focus herein is on the metrics illustrated in (i) the second graph in the first row (i.e. the % Rewrite data), (ii) the second graph in the second row (i.e. the Stop-write data), and (iii) the third graph in the first row (i.e. the % C2SER data).

For the % Rewrite data, the Y-axis is the % rewrite capacity loss, which is particularly meaningful in the write mode. For the Stop-write data, the Y-axis is the stop-write count per GB, which is also meaningful in the write mode. For the % C2SER data, the Y-axis is the input error rate, which is particularly meaningful in the read mode, including read verify.

The graphs provided in FIG. 4 are illustrative of good behavior of a tape drive, with all functional TMR heads as detected in write mode. As shown, the % Rewrite data, the Stop-write data, and the % C2SER data all show results below particular threshold values.

It is appreciated, however, that when the % rewrites are around 6.2% and fixed, such as shown in FIG. 5, this is an indication of a potential problem. More particularly, if such level of % rewrites persists for a long enough period of time during testing, it will ultimately cause and/or provide evidence of an EOP problem, such as when there are problems with the read heads (TMR sensors). It is further appreciated that this can be detected by the host based on how much data is written to how much tape length, while the media library can also detect the same issues using the same variables as the host plus performance metrics, such as % rewrites as shown.

FIG. 5 is a graphical illustration of library accessible drive performance metrics for a typical performance of a tape drive with a suspect channel that has been identified as an EOP error candidate, such drive performance metrics being obtained during testing of the read heads. When the tape drive being tested reads a prerecorded cartridge like the test cartridge described herein, where the writing drive had all functional channels (writers and readers), its read performance can be analyzed by the % C2SER variable. When the reading tape drive has a bad channel (i.e. 1 bad channel out of 32 total channels) that is fully bad due to either debris or open or fully short, the % C2SER will be at least a minimum of 3.125%. This is because of LTO-8 format C2 ECC where data is encoded using Reed Solomon RS code with a policy using 84 user data chunks, 12 parities total codeword chunks 96. With a total of 32 channels, the format spreads all 96 chunks across all 32 channels resulting in each channel having 3 C2 ECC codeword symbols. Thus, for the loss of one channel, the input error rate to C2 ECC which is C2 SER will be 3/96=3.125%. Therefore, testing % C2SER for being at least 3.125% and across the entire tape from the beginning of tape (BOT) to the end of tape (EOT) will provide the needed detection for a bad TMR channel. Although reading a single data point representing the entire tape can be used as well, relying on multiple data points along the tape in both directions will provide better data since with single point it is possible that there is only a bad section of tape, but this may still be detected as a bad head.

It is noted that the TMR read sensor test is shown to be a single pass in FIG. 5. In some instances, the reliability of the sensor can be improved by repeating the process using the same test cartridge as well as using more than one test cartridge as described for the other test modes.

FIG. 6 is a graphical illustration of library accessible drive performance metrics for a typical performance of a tape drive with a partial bad channel that will generate an EOP problem, such drive performance metrics being obtained during testing of the read heads. In particular, in FIG. 6, the tape drive may generate an EOP problem since in write mode the % Rewrite is 6.2% as in FIG. 5. However, it is noted that the read performance, as analyzed via % C2SER, is different from what was shown in FIG. 5. The % C2SER is not near zero, as in FIG. 4, and it is not fixed at 3.125% as in FIG. 5, but rather the % C2SER is in between such values and fluctuates from the beginning of tape (BOT) to the end of tape (EOT) in both directions. From the % Rewrite analysis, it is known that this tape drive has a bad channel, but from read mode using % C2SER, it is also known that this tape drive has either debris or partial shorted TMR for which the tape drive is sometimes able to compensate. Thus, by doing a cleaning process in this case and then rechecking the % C2SER variable again using the test cartridge, it can be determined if the cleaning process was successful or not. It is appreciated that if the cleaning process was successful, then the tape drive can still be used. Otherwise, if the cleaning process was not successful, then the tape drive needs to be replaced and returned.

Returning again to FIG. 3, at optional step 307, if the media library has determined that a cleaning process is warranted for the tape drive being tested, the media library will unload the test cartridge and load a cleaning cartridge into the tape drive. Loading of the cleaning cartridge will initiate an automatic drive cleaning process to clean the tape heads of the tape drive.

At step 308, after the cleaning process has been completed, the media library can unload the cleaning cartridge and reload the test cartridge.

At step 309, the media library reinitiates the request for the tape drive to perform read verify operations using the test cartridge, such as detailed above in relation to step 304.

At step 310, information from the tape drive in the form of a performance data log page is again provided from the tape drive to the media library based on the subsequent round of read verify operations that have been performed by the tape drive, such as detailed above in relation to step 305.

At step 311, the media library is configured to once again run the TMR sensor algorithm, in which the library control system (hardware and firmware) analyzes the performance data that has been collected and determines the condition of the TMR read heads, such as detailed above in relation to step 306. In particular, the media library will reanalyze the performance data to determine if the cleaning procedure was successful.

At step 312, the media library sends a report to the host detailing the status of the health of the tape heads of the tape drive that has just been tested. For example, if the media library has determined that the cleaning process was successful, then the media library will inform the host that the tested tape drive can be reused. However, if the media library has determined that the cleaning process was unsuccessful, then the media library will inform the host to isolate the tested tape drive so that the tape drive can be removed and repaired and/or replaced, with a new tape drive being installed. It is appreciated that if at step 306, the media library determines that no cleaning process of the tape drive (and tape heads) is warranted, then the process can skip to step 312 and the media drive can then inform the host that the tape drive is again available for use.

It is appreciated that when testing of the tape drive results in error, the drive dump will be captured and provided to the host as part of the status feedback such that the host can write the drive dump to the test cartridge special zone to be used as part of a deeper, more detailed analysis.

It is further appreciated that throughout this process, the host is still able to operate using other tape drives, and the media library is able to support both host needs as well as the tape drive testing process without adversely impacting the overall system performance all using its available drive performance variables.

The description of read mode testing of the tape drives as illustrated and described in FIGS. 3-6 defines how the media library can use its own resources to test the TMR read heads of the tape drive without having access to the full data path inherent within the tape drive itself. It is understood that the above description does not also cover testing for the write process since the media library does not have the ability to write to the tape drive, unlike the read process which is feasible through the read verify process. However, it is further appreciated that an analysis of the write head performance and especially the tracking performance can be just as important as conducting the read head sensor testing as described above.

Figure 7:
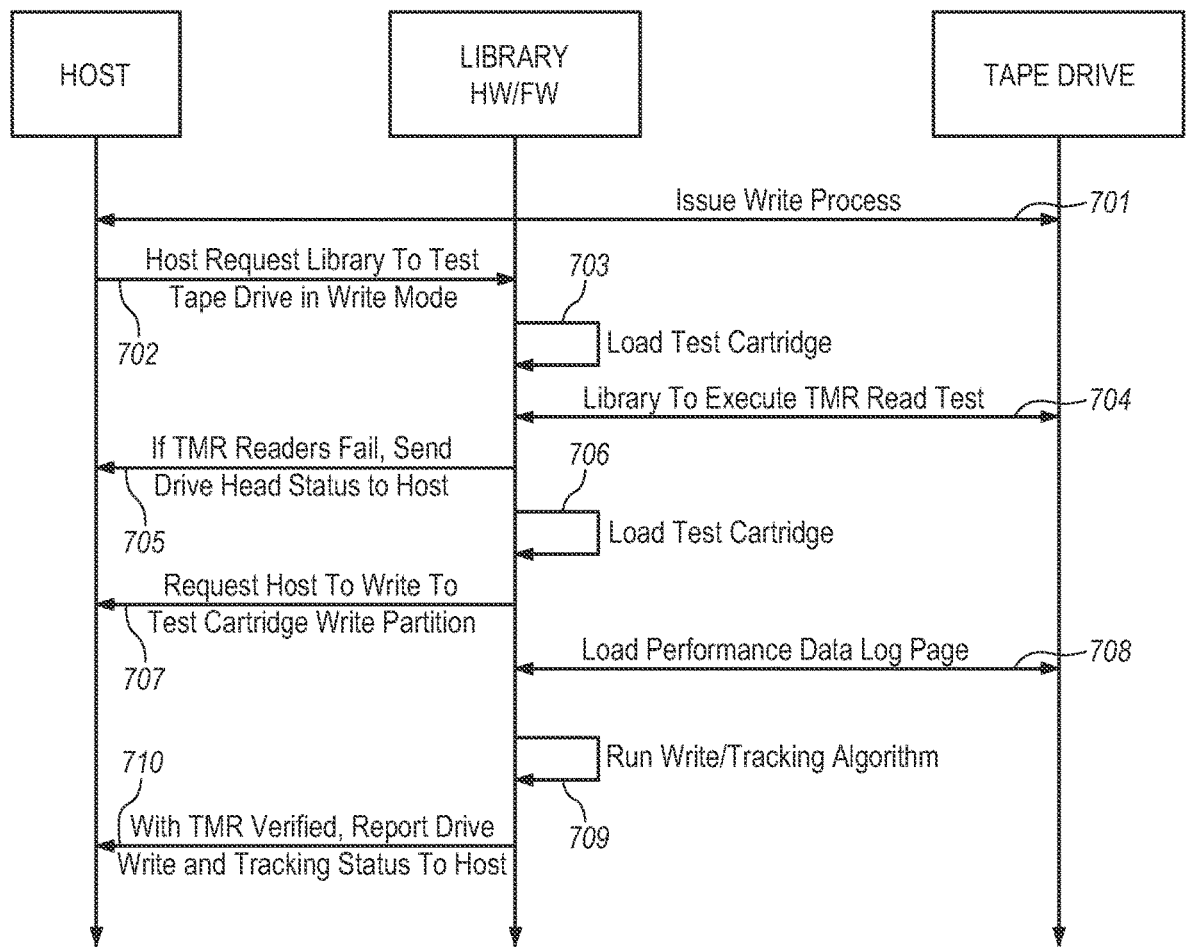
FIG. 7 is a simplified flow chart illustrating an order of tasks between a host, library hardware/firmware, and a tape drive in one implementation of the present invention that further tests writes heads.

As opposed to the read head testing and analysis as described above, which is typically initiated based on problems seen by the host during actual use of the tape drive, in situations where the host wants to initiate the periodic testing of a tape drive and/or when the host wants to initiate testing of a new tape drive, the host may want to test both read heads and write heads. FIG. 7 is a simplified flow chart illustrating an order of tasks between a host, library hardware/firmware (or a library control system), and a tape drive in one implementation of the present invention that further tests write heads. More particularly, FIG. 7 shows a process for testing the health of the write heads of the tape drive including tracking, which includes testing of the TMR read sensors such as described above being conducted prior to full testing of the tracking and writing by the write heads. The TMR read sensors must be verified and cleaned as necessary prior to testing of the tracking and writing process, where the cleaning of the read heads will also clean the write heads.

Testing of the write heads can again include the collection and analysis of drive performance metrics such as one or more of (1) log (C1SER) data; (2) % Rewrite data; (3) % C2SER data; (4) MBps data; (5) Stop-write data; and (6) ERP data, which have been illustrated in FIGS. 4-6. However, during the write mode testing process, the % Rewrite data and the Stop-write data are generally the most critical drive performance metrics, along with the others noted, except for the % C2SER which is only valid in read mode testing. In certain implementations, write quality can be effectively evaluated by analysis of % Rewrite data and C1SER.

Initially, at step 701, the host can issue a write process request to be performed by the tape drive being tested. As above, it is appreciated that while the host is using the tape drive for a writing procedure, the host still has the ability to estimate the quality of the tape drive regarding if the probability of an EOP problem is high by capturing tape media linear position ("LPOS") and the amount of data written to the tape. In particular, using both variables, the host can estimate if EOP problems are highly likely or not.

At step 702, the host sends a request to the media library to test the tape drive in write mode. As noted, the host will often send such a request when the host wants to initiate periodic testing of the tape drive and/or when the host wants to initiate testing of a new tape drive. Similar to the above process, when the host wants to initiate such testing of the tape drive, the host can stop the write procedure and move the media cartridge to another tape drive so that the write process can continue using another tape drive. The host can then send the request to the media library to provide the desired write mode testing of the tape drive.

At step 703, the media library loads a test cartridge into the tape drive to be tested. In particular, the media library loads the special test cartridge into the tape drive, where controlled configured data has originally been written to various locations onto the tape within the test cartridge. The test cartridge is then usable by the media library to test the TMR read heads to verify if cleaning is necessary. It is appreciated that the test cartridge is such as described in greater detail above. More specifically, the test cartridge will again have at least four partitions, with each partition having a data band of an equal size. The top and bottom partitions, which will include edge tracks, will have prerecorded tracks that are both trimmed and untrimmed. The media library will use such tracks in the top and bottom partitions to test the TMR read sensors. A third partition will be used by each tape drive to write random test data for writer and tracking evaluation. A fourth partition can be used by the host to keep the test data with its own metadata so that the system can have access to the historical data to implement Artificial Intelligence or Machine Learning-type predictive algorithms for drive maintenance. Such data can include, but is not limited to: (i) read log page data and analysis results; (ii) write mode logs and analysis results; (iii) tape drive serial number; (iv) drive dumps (i.e. detailed information about the heads that is generated during testing) when there is an error; (v) environmental conditions; (vi) cleaning data; and (vii) date and time. In certain alternative embodiments, the historical test data can again initially be stored in a buffer, and the library control system can schedule a time for such historical test data to be dumped to the fourth partition of the pre-written test cartridge during a low duty time.

Subsequently, at step 704, the media library executes a testing of the health of the TMR read sensors, such as described in detail above. More particularly, during step 704, a process is undertaken wherein the library control system determines if cleaning of the read head sensors if necessary and evaluates the quality and state of the TMR read head sensors. Such a process is described in greater detail above in relation to steps 304-311 as illustrated and described in relation to FIG. 3. It is appreciated that such steps inherent within step 704 include the collection and analysis of various drive performance metrics such as one or more of (1) log (C1SER) data; (2) % Rewrite data; (3) % C2SER data; (4) MBps data; (5) Stop-write data; and (6) ERP data.

At step 705, in the event that the TMR read head sensors fail in any capacity, the media library sends a report to the host detailing drive head status of the tape drive that has just been tested. Such drive head status can again include detailing of the necessity of cleaning of the tape heads and whether or not any such cleaning process was successful. Such drive head status at this point in the overall process can further include a determination of whether or not the tape drive being tested needs to be isolated so that the tape drive can be removed and repaired and/or replaced, with a new tape drive being installed.

If the tape drive has not yet been isolated and removed, at step 706, the media library can again load the test cartridge so that desired tape drive performance metrics can be collected.

At step 707, the media library sends a request to the host so that the host writes data to the write partition of the test cartridge. More specifically, the media library requests that the host write random test data to the third partition which can then be used for writer and tracking evaluation.

At step 708, information from the tape drive in the form of a performance data log page is provided from the tape drive to the media library based on the testing operations that have been performed by the tape drive. In particular, information from the tape drive in the form of the performance data log can be provided to the media library based on the testing operations performed using the third partition of the test cartridge that includes the random test data as written into such partition by the host.

At step 709, the media library is configured to run a write/tracking algorithm, in which the library control system (hardware and firmware) analyzes the performance data that has been collected during the testing operations performed using the third partition of the test cartridge. It is appreciated that such performance data again includes various drive performance metrics such as described above.

In certain implementations, the quality of the write heads can be evaluated through analysis of the % Rewrite data and C1SER data. It is noted that during the TMR read head sensor verification phase of this write head testing process, previously written good quality write data in the test cartridge is used so that that once the tape drive passes such TMR read head sensor testing procedures, a confidence level can be achieved that the read heads are in good condition.

C1SER typically provides an indication of the level of random errors that drive per channel ECC can correct. These are mainly due to writer spacing loss or media degradation. Thus, utilizing test cartridges with known magnetics, and with the potential use of multiple such test cartridges, the algorithm can use the C1SER data to predict a condition of the write heads.

Additionally, it is appreciated that the % Rewrite data is a result of channel ECC failing to correct for errors. This usually occurs with media defects that are too large for channel ECC to detect and correct, or due to write head clogging (assuming at this stage that the condition of the read heads is known).

Thus, with previously verified TMR read head sensors, the controlled write process using a dedicated write partition of the same test cartridge where the host has written random test data enables the media library to capture drive log data and provide desired tracking and write head analysis utilizing the drive performance metrics from the tape drive. Some such data analysis is graphically illustrated in FIG. 8, FIG. 9 and FIG. 10.

FIG. 8 is a graphical illustration of a stop write capacity loss write mode tracking model versus test data. Additionally, FIG. 9 is a graphical illustration of test results showing various drive conditions for write mode analysis.

Figure 9:
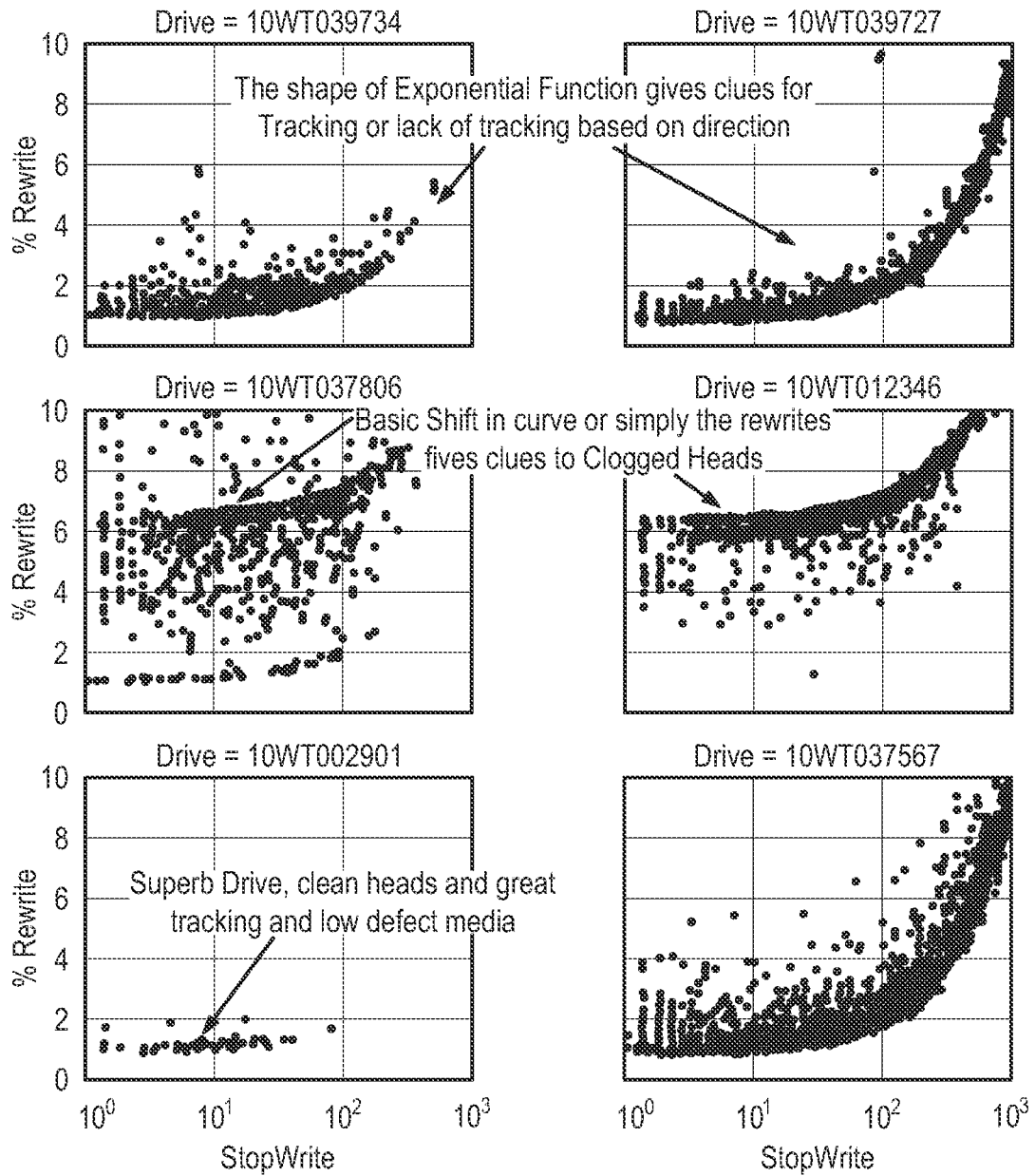
FIG. 9 is a graphical illustration of test results showing various drive conditions for write mode analysis.

As shown in FIG. 8 and FIG. 9, the media library can determine if capacity loss is due to tracking issues or media defects or clogged/damaged heads by analyzing the relationship between % Rewrite data and Stop-write data using tape position as the controlling data capture. The media library captures % Rewrite data and Stop-write data over a section of the tape using LPOS, and builds a database where after capture it can curve fit using % Rewrite data and Stop-write data over the same zone to determine whether or not the tape drive is having any tracking problems. The use of LPOS is critical since it is necessary to establish multiple pairs of % Rewrites and Stop-writes across the tape to fit the data using correlated pairs, while not mixing tracking data with rewrites captured at different places on tape.

In FIG. 8, a write mode tracking model is illustrated utilizing % Rewrite data (shown along the Y-axis) and Stop-write data (shown along the X-axis). FIG. 9 illustrates test results for various drive conditions for the write mode analysis. For example, the exponential function demonstrated by the particular curve modeled by the test data provides clues for tracking or lack of tracking based on direction. Additionally, a basic shift in the curve from the test data, or simply the Rewrite data can provide clues as to potential clogged heads.

Once potential tracking problems are identified, it is next important to determine if the tracking errors are correlated. This can further be evaluated by repeating the testing using different test cartridges in order to confirm that the problems exist within the tape drive itself and not the media. For example, this can be done by using multiple test cartridges since the media library can include three such test cartridges. As noted, the use of multiple such test cartridges can effectively differentiate between media issues and tape drive issues including for both read tests and write tests. In particular, it is appreciated that although the Figures show loading and testing the tape drives with a single test cartridge, in actual application the media library will need more than one such test cartridge to ensure statistically significant analysis to differentiate between errors due to the media and errors due to the tape drive.

Figure 10:
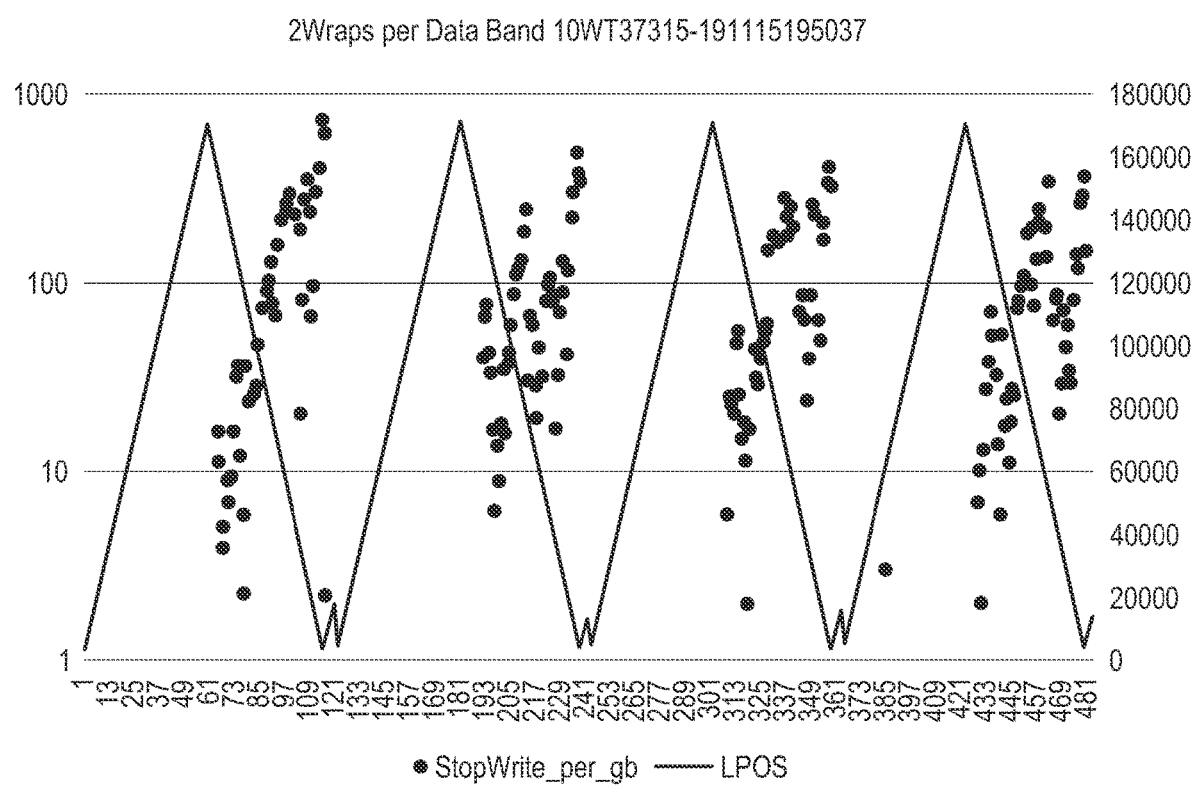
FIG. 10 is a graphical illustration of tracking performance to determine correlated errors.

FIG. 10 is a graphical illustration of tracking performance to determine correlated errors. More particularly, by using data and statistical analysis such as provided within FIG. 8 and FIG. 9, FIG. 10 captures the idea that by using more than one test cartridge, the media library can make a more accurate determination about the health of the tracking capability of a given tape drive using limits on correlated tracking errors and the % Rewrite versus Stop-write curve with LPOS. Stated in another manner, a graphical illustration of correlated tracking errors, such as shown in FIG. 10, when detected using one or more test cartridges with one or more repeat usages, can effectively result in identification of any tape drive tracking problems.

Returning again to FIG. 7, at step 710, with the TMR read head sensor previously having been verified, the media library sends a report to the host detailing the health of the write heads and tracking status of the tape drive that has just been tested. At this point, depending on the specific status that has been reported to the host, the host can have the option of using the tape drive for performing read tasks where the tracking margins are wider, or the host can just replace the tape drive if deemed necessary and/or appropriate.

As described, the write head analysis utilizing the algorithms of the present invention is similar to the previously described read head analysis. In particular, with the read head testing already confirming that the TMR readers are working, the write head testing utilizes one or more test cartridges, which can establish the quality of the writers once confirming that the tape drive does not have a tracking problem that hides the issues with the write heads. Since the test cartridge has a specific zone or partition within which to write, this section of the media will have known defect characteristics.

It is appreciated that with the drive readers already confirmed and the tracking performance also verified, the observations using % Rewrite and C1SER will point to any issues that exist within the write heads. For example, if the system detects a high percentage of rewrites indicating a head loss in the write mode after verifying the read heads in read mode and tracking, the media library can issue a write head problem detected after repeating the test with other cartridges and more repeats if needed. This can let the host know to remove the particular tape drive from the pool to prevent bad writing. When the test results in error, a tape drive will be captured and provided to the host as part of the status feedback such that the host can write the drive dump to a special zone on the test cartridge.

In summary, as described herein, the algorithm of the present invention can provide single tests of tape drives for evaluating the TMR heads, as well as testing the write performance for writer quality and tracking using one or more test cartridges. With the host and the media library working together as a system, and with the tape drive testing being an on-going process that can be implemented periodically or in a random manner, the results of each test can be saved by the media library to build a database. The database can subsequently be used by the host, the media library, or by other cloud-based analytic to predict changes and/or degradation with the tape drives in order to provide preventive repairs when necessary. The data from this process of testing and verifying of the tape drives can also be utilized to establish a time-zero performance metric, which can be subsequently used for purposes of predictive analysis following the present methodology.

It is appreciated that the noted database can exist anywhere within the system, such as in the media library, in the cloud, and/or at the host application. In the media library, the database can be kept within the test cartridges using another special zone or partition. With such design, as the tape drives are tested, the results are communicated to the host, and the host can then use the test cartridges to write the results with metadata related to time, tape drive, tape cartridge barcode labels and serial numbers. By way of example, after a TMR read test or a writing/tracking test, the host can update the test cartridge database partition with the test results. The results can thus be read periodically to run its own Artificial Intelligence or Machine Learning algorithms for predictive maintenance of the tape drives, which will optimize capacity use and performance of the overall system.

Figure 11:
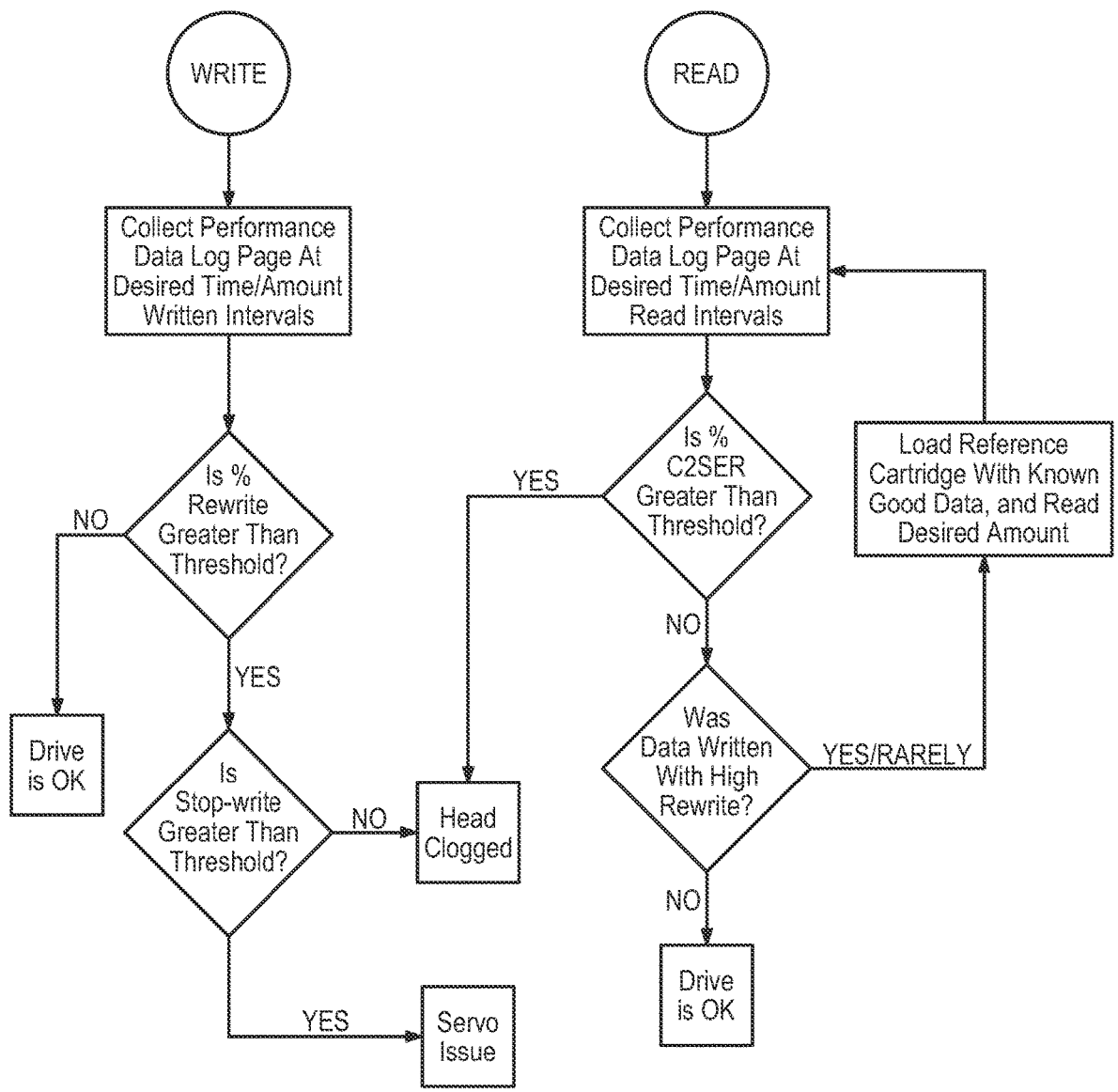
FIG. 11 is a simplified flow chart illustrating one representative embodiment of a decision tree algorithm usable for analyzing a health of the read heads and the write heads of a tape drive.

FIG. 11 is a simplified flow chart illustrating one representative embodiment of a decision tree algorithm usable for analyzing a health of the write heads (shown on the left side of FIG. 11) and the read heads (shown on the right side of FIG. 11) of a tape drive. More particularly, FIG. 11 illustrates the algorithm to determine drive head health and/or status after any write or read operations.

For write operations, the algorithm initially collects performance data log pages from the tape drive at desired time intervals, and/or after a certain threshold amount (MB) of data has been written. The algorithm then evaluates and/or analyzes the drive performance metrics included on the performance data log pages. In particular, for write operations, the algorithm checks the rewrite parameter first. It is appreciated that only a good tape drive with good tape heads could yield a reasonable performance value in analyzing the % Rewrites. In particular, if the % Rewrite value is not greater than a certain predetermined threshold value, the algorithm determines that the drive is good. Conversely, if the % Rewrite value is greater than the predetermined threshold value, with degraded rewrite performance (excessive capacity loss), the algorithm then evaluates and/or analyzes the Stop-write value in order to differentiate between head clogs versus servo related root causes. More particularly, if the Stop-write value is not greater than a certain predetermined threshold value, then the degraded rewrite performance is determined by the algorithm to be due to one or more heads being clogged. Conversely, if the Stop-write value is greater than the predetermined threshold value, then the degraded rewrite performance is determined by the algorithm to be due to servo issues.

For read operations, the algorithm initially collects performance data log pages from the tape drive at desired time intervals, and/or after a certain threshold amount (MB) of data has been read. The algorithm then evaluates and/or analyzes the drive performance metrics included on the performance data log pages. In particular, the algorithm focuses on the C2 symbol error rate (% C2SER) from among the drive performance metrics. If the % C2SER value is greater than a predetermined threshold value, then the algorithm determines that this is likely due to a clogged read head. It is appreciated that in rare cases, the data on tape could be written by a head with similar clogged channels. In such situations, the % C2SER would be low even if the read head is clogged. Therefore, to avoid falsely determining that the read heads are normal, the algorithm has an additional step to confirm the data on tape was written by a normal, non-clogged head. More specifically, the algorithm then evaluates whether or not the data was written with a high rewrite value. If the data was not written with a high rewrite value, then the algorithm determines that the drive is good. Conversely, if the data was written with a high rewrite value, then the algorithm proceeds to load a reference cartridge into the tape drive, which has known good data. The tape drive then is requested to read a desired amount of the reference cartridge with the known good data, and the overall process is repeated with the algorithm again collecting the desired performance data log pages. During the repeat of the process, the algorithm can then determine if the tape drive has one or more clogged heads or if the tape drive is good, with more certainty.

In summary, the problem of accurately determining a health of one or more heads (both read heads and write heads) of a media drive without having access to the data path inherent within the media drive itself is overcome by configuring the library control system of a media library to receive information in the form of drive performance metrics generated by the media drive during the performance of a read verify procedure upon request of the library control system, and to further analyze the information, i.e. the drive performance metrics, to determine the health of the one or more heads of the media drive. Thus, by having the library control system of the media library configured in such manner, the present invention is able to provide one or more advantages, such as effectively analyzing the health of the heads of the media drive without access to the proprietary information only available within the media drive itself; and utilizing the analysis to be able to effectively predict potential maintenance requirements for the media drive.

It is understood that although a number of different embodiments of the media library system have been illustrated and described herein, one or more features of any one embodiment can be combined with one or more features of one or more of the other embodiments, provided that such combination satisfies the intent of the present invention.

While a number of exemplary aspects and embodiments of the media library system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A media library for evaluating a health of a head of a media drive, the media library comprising:
   a library control system that is configured to control oversight functionality of the media library, the library control system receiving media drive information generated during at least one of a read procedure being performed by the media drive and a write procedure being performed by the media drive, the library control system analyzing the media drive information so that the library control system can determine the health of the head of the media drive;
   wherein the media drive information includes drive performance metrics generated by the media drive during a read verify procedure that is performed by the media drive upon request of the library control system to the media library; and
   wherein the drive performance metrics include at least one of log (C1SER) data, % Rewrite data, % C2SER data, and Stop-write data.

2. The media library of claim 1 wherein the drive performance metrics include at least two of log (C1SER) data, % Rewrite data, % C2SER data, and Stop-write data.

3. The media library of claim 1 wherein the drive performance metrics include at least three of log (C1SER) data, % Rewrite data, % C2SER data, and Stop-write data.

4. The media library of claim 1 wherein the drive performance metrics include each of log (C1SER) data, % Rewrite data, % C2SER data, and Stop-write data.

5. A media library for evaluating a health of a head of a media drive, the media library comprising:
   a library control system that is configured to control oversight functionality of the media library, the library control system receiving media drive information generated during at least one of a read procedure being performed by the media drive and a write procedure being performed by the media drive, the library control system analyzing the media drive information so that the library control system can determine the health of the head of the media drive;
   wherein the media drive information includes drive performance metrics generated by the media drive during a read verify procedure that is performed by the media drive upon request of the library control system to the media library; and
   wherein the library control system of the media library requests the media drive to perform the read verify procedure using a pre-written test cartridge that includes pre-written data within a first partition and a second partition, the pre-written data being usable to test a read head of the media drive.

6. The media library of claim 5 wherein the library control system utilizes a read head sensor algorithm to analyze the drive performance metrics generated by the media drive as the media drive reads from the first partition and the second partition to determine the health of the read head of the media drive, and the library control system generates a read head report regarding the health of the read head of the media drive.

7. The media library of claim 6 wherein the library control system utilizes the read head sensor algorithm to analyze the drive performance metrics generated by the media drive as the media drive reads from the first partition and the second partition to determine whether the read head of the media drive needs to be cleaned.

8. The media library of claim 6 wherein the test cartridge includes a third partition, the media library requests that a host write random data into the third partition to be read by the media drive during an evaluation of a write head of the media drive, the library control system utilizes a write head tracking algorithm to analyze the drive performance metrics generated by the media drive as the media drive reads from the third partition to determine the health of the write head of the media drive, and the library control system generates a write head report regarding the health of the write head of the media drive.

9. The media library of claim 8 wherein the host writes a drive dump to a fourth partition of the pre-written test cartridge including information from the read head report and the write head report, and the library control system utilizes one of an Artificial Intelligence and a Machine Learning-type predictive algorithm for evaluating media drive maintenance requirements based on the information included within the drive dump.

10. A method for evaluating a health of a head of a media drive, the method comprising the steps of:
   controlling oversight functionality of a media library with a library control system of the media library;
   receiving media drive information with the library control system, the media drive information being generated during at least one of a read procedure and a write procedure being performed by the media drive; and
   analyzing the media drive information with the library control system to determine the health of the head of the media drive;
   wherein the step of receiving includes the media drive information including drive performance metrics generated by the media drive during a read verify procedure performed by the media drive upon request of the library control system to the media library; and
   wherein the step of receiving includes the drive performance metrics including at least one of log (C1SER) data, % Rewrite data, % C2SER data, and Stop-write data.

11. The method of claim 10 wherein the step of receiving includes the drive performance metrics including each of % Rewrite data, % C2SER data, and Stop-write data.

12. A method for evaluating a health of a head of a media drive, the method comprising the steps of:
   controlling oversight functionality of a media library with a library control system of the media library;
   receiving media drive information with the library control system, the media drive information being generated during at least one of a read procedure and a write procedure being performed by the media drive, the media drive information including drive performance metrics generated by the media drive during a read verify procedure performed by the media drive upon request of the library control system to the media library; and
   analyzing the media drive information with the library control system to determine the health of the head of the media drive;
   requesting with the library control system that the media drive perform the read verify procedure using a pre-written test cartridge that includes pre-written data within a first partition and a second partition, the pre-written data being usable to test a read head of the media drive.

13. The method of claim 12 wherein the step of analyzing includes the library control system utilizing a read head sensor algorithm to analyze the drive performance metrics generated by the media drive as the media drive reads from the first partition and the second partition to determine the health of the read head of the media drive, and further comprising the step of generating a read head report with the library control system regarding the health of the read head of the media drive.

14. The method of claim 13 further comprising the step of requesting with the library control system of the media library that a host write random data into a third partition of the pre-written test cartridge to be read by the media drive during an evaluation of a write head of the media drive, wherein the step of analyzing includes the library control system utilizing a write head tracking algorithm to analyze the drive performance metrics generated by the media drive as the media drive reads from the third partition to determine the health of the write head of the media drive, and further comprising the step of generating a write head report with the library control system regarding the health of the write head of the media drive.

15. The method of claim 14 further comprising the steps of the host writing a drive dump to a fourth partition of the pre-written test cartridge including information from the read head report and the write head report, and the library control system utilizing one of an Artificial Intelligence and a Machine Learning-type predictive algorithm for evaluating media drive maintenance requirements based on the information included within the drive dump.

16. A media library for evaluating a health of a head of a media drive, the media library comprising:
   a library control system that is configured to control oversight functionality of the media library, the library control system receiving media drive information including drive performance metrics generated by the media drive during a read verify procedure performed by the media drive upon request of the library control system to the media library, the drive performance metrics include at least two of log (C1SER) data, % Rewrite data, % C2SER data, and Stop-write data;
   wherein the library control system of the media library requests the media drive to perform the read verify procedure using a pre-written test cartridge that includes pre-written data within a first partition and a second partition, the pre-written data being usable to test a read head of the media drive;
   wherein the library control system utilizes a read head sensor algorithm to analyze the drive performance metrics generated by the media drive as the media drive reads from the first partition and the second partition to determine the health of the read head of the media drive;
   wherein the library control system generates a read head report regarding the health of the read head of the media drive;
   wherein the media library requests that a host write random data into a third partition of the test cartridge to be read by the media drive during an evaluation of a write head of the media drive;

wherein the library control system utilizes a write head tracking algorithm to analyze the drive performance metrics generated by the media drive as the media drive reads from the third partition to determine the health of the write head of the media drive; and wherein the library control system generates a write head report regarding the health of the write head of the media drive.

17. The media library of claim 16 wherein the drive performance metrics include each of log (C1SER) data, % Rewrite data, % C2SER data, and Stop-write data.

18. The media library of claim 16 wherein the library control system utilizes the read head sensor algorithm to analyze the drive performance metrics generated by the media drive as the media drive reads from the first partition and the second partition to determine whether the read head of the media drive needs to be cleaned.

19. The media library of claim 16 wherein the host writes a drive dump to a fourth partition of the pre-written test cartridge including information from the read head report and the write head report, and the library control system utilizes one of an Artificial Intelligence and a Machine Learning-type predictive algorithm for evaluating media drive maintenance requirements based on the information included within the drive dump.

20. The method of claim 13 wherein the step of analyzing includes the library control system utilizing the read head sensor algorithm to analyze the drive performance metrics generated by the media drive as the media drive reads from the first partition and the second partition to determine whether the read head of the media drive needs to be cleaned.

\* \* \* \* \*